United States Patent
Althammer

(10) Patent No.: US 8,408,603 B2
(45) Date of Patent: Apr. 2, 2013

(54) AUTOMATIC COUPLING DEVICE

(75) Inventor: Jürgen Althammer, Kraiburg (DE)

(73) Assignee: Belimed GmbH (DE)

( * ) Notice: Subject to any disclaimer, the term of this patent is extended or adjusted under 35 U.S.C. 154(b) by 776 days.

(21) Appl. No.: 10/553,150

(22) PCT Filed: Apr. 14, 2004

(86) PCT No.: PCT/EP2004/003924
§ 371 (c)(1),
(2), (4) Date: Dec. 22, 2005

(87) PCT Pub. No.: WO2004/090406
PCT Pub. Date: Oct. 21, 2004

(65) Prior Publication Data
US 2007/0096466 A1    May 3, 2007

(30) Foreign Application Priority Data
Apr. 14, 2003 (DE) .................. 103 17 150

(51) Int. Cl.
*F16L 17/00* (2006.01)
(52) U.S. Cl. ............... 285/96; 285/100; 285/106
(58) Field of Classification Search ............ 285/96–97, 285/106, 196, 338, 347, 100–102, 11
See application file for complete search history.

(56) References Cited

U.S. PATENT DOCUMENTS

| 317,408 A * | 5/1885 | Moeser ................. 285/10 |
| 661,352 A * | 11/1900 | Moody ................. 285/347 |
| 863,001 A * | 8/1907 | Seebeck ............... 220/262 |
| 3,074,748 A * | 1/1963 | Ulrich ................... 285/347 |
| 3,642,289 A | 2/1972 | Basham et al. ............ 277/1 |
| 3,761,114 A | 9/1973 | Blakeley ............... 285/111 |
| 3,944,263 A * | 3/1976 | Arnold ................... 285/96 |
| 5,071,140 A | 12/1991 | Quevedo del Rio |

FOREIGN PATENT DOCUMENTS

| CH | 558 494 | 1/1975 |
| DE | 199 26 962 | 12/1999 |
| GB | 1 223 846 | 3/1971 |

* cited by examiner

*Primary Examiner* — Aaron Dunwoody
*Assistant Examiner* — Fannie Kee
(74) *Attorney, Agent, or Firm* — Ostrolenk Faber LLP

(57) ABSTRACT

A coupling device for a sealed coupling of first and second pipe sections, which are movable with respect to one another and at the ends of which respective flanges are fastened to be mutually sealed. The end face of the second flange, which is directed toward the first flange, includes an annular groove and a sealing element is disposed within the annular groove. The annular groove is configured to be subjected to pressure so as to press the sealing element against the end face of the first flange. The sealing element is a sealing ring made of elastic material.

4 Claims, 1 Drawing Sheet

AUTOMATIC COUPLING DEVICE

BACKGROUND OF THE INVENTION

The invention relates to a coupling device for the sealed coupling of first and second pipe sections which are movable one relative to the other.

Coupling devices are known in which both pipe sections are provided at their mutually adjacent ends with coupling flanges, which can be connected one to another by fastening means and between which a seal is disposed so as to obtain a mutual sealing of the two pipe sections. A satisfactory seal can only be achieved if the two flanges are clamped together fixedly with considerable force. Moreover, even small deviations of the flanges from a mutually parallel arrangement are sufficient to cause the media carried in the pipe sections (gases or liquids) to leak out.

In order to prevent this problem, it is known from U.S. Pat. No. 3,761,114 to dispose in an annular groove in one of the flanges a seal which, in the annular groove, has a double-walled portion, the walls of which at the groove floor are connected one to another in such a way that the space between the walls of the seal is subjected to the pressure of the medium in the pipe sections. In this way, the seal becomes pressed against the faces to be mutually sealed, which pressing becomes greater with rising pressure. It is here necessary, however, that the faces of the flanges bear precisely one against the other and that the pressure of the medium is large enough to ensure the pressing of the seal. Furthermore, additional fastening means are necessary to fasten the flanges one against the other.

From U.S. Pat. No. 3,642,289 a similar arrangement is known, in which, in the annular groove of a flange, an annular piston is movable, which on its internal and external peripheral faces and its outer end face has sealing elements for sealing against the walls of the annular groove and against the other flange. The space between the floor of the annular groove and the piston is subjected to a pressurized medium so as to press the piston against the other flange. The piston must be guided relatively precisely in the annular groove, since otherwise the sealing against the annular groove is lost. Here too, therefore, the flanges must be relatively precisely parallel to each other in order to obtain a satisfactory seal.

In dishwashers with radial offset between the pipe sections which are to be coupled together, it is further known from DE 199 26 962 to fasten a bellows seal to one flange, while the other flange, at least in a radial direction, is configured with a relatively large surface area in order to guarantee a bearing contact of the bellows seal if the two pipe sections are radially displaced. The pressing of the bellows seal against the movable flange is in this case realized by purely mechanical means.

SUMMARY OF THE INVENTION

The object of the invention is to provide a coupling device for the sealed coupling of first and second pipe sections which are movable one relative to the other, of the type defined in the introduction, which coupling device, with simple mounting, ensures a secure seal even when the surfaces to be mutually sealed are not in precise mutual alignment.

This object is achieved by the coupling device for the sealed coupling of first and second pipe sections which are movable one relative to the other and at the ends of which respective flanges are fastened which are to be mutually sealed. The end face of the second flange, which is directed toward the first flange, includes an annular groove and a sealing element is disposed within the annular groove. The annular groove is configured to be subjected to pressure so as to press the sealing element against the end face of the first flange. The sealing element is a sealing ring made of elastic material.

Advantageous embodiments and refinements of the invention are disclosed herein.

By virtue of the fact that the sealing element is a sealing ring made of elastic material, a satisfactory mutual sealing of the flanges is obtained with simple mounting, even when these are not precisely parallel to each other or the flanges are mutually displaced in the radial direction. The elasticity of the sealing ring compensates for minor inaccuracies.

The sealing ring preferably has a circular cross section.

In a preferred embodiment, the annular groove has at least one duct, which, for the creation of the sealing engagement, can be subjected to compressed air and, for the retraction of the sealing ring, can be subjected to underpressure, the duct emerging in the floor of the annular groove.

A preferred application of the invention is obtained in cleaning, disinfection and drying plants for the treatment of accessories and general laundry in hospital practice and pharmaceutical production.

The coupling device can here be disposed between a receiving trolley and a booth-feed facility, for the purpose of connecting spray buttons and nozzles in the receiving trolley.

BRIEF DESCRIPTION OF THE DRAWINGS

The invention is explained in greater detail below with reference to an embodiment represented in the drawings.

In the drawings.

DETAILED DESCRIPTION OF THE PREFERRED EMBODIMENTS AND THE DRAWINGS

Figure 1:
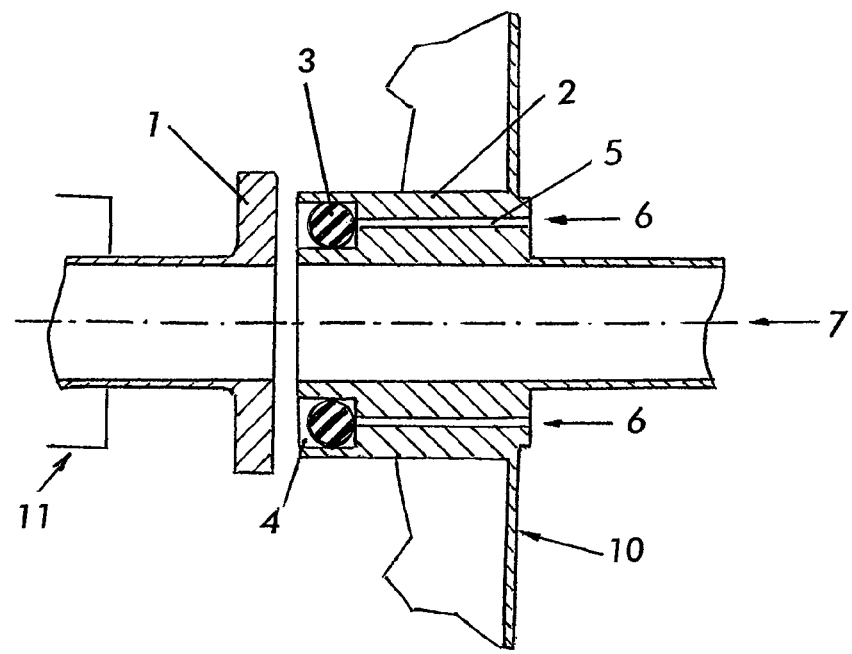
FIG. 1 shows an embodiment of the coupling device in a state without sealing engagement.
Figure 2:
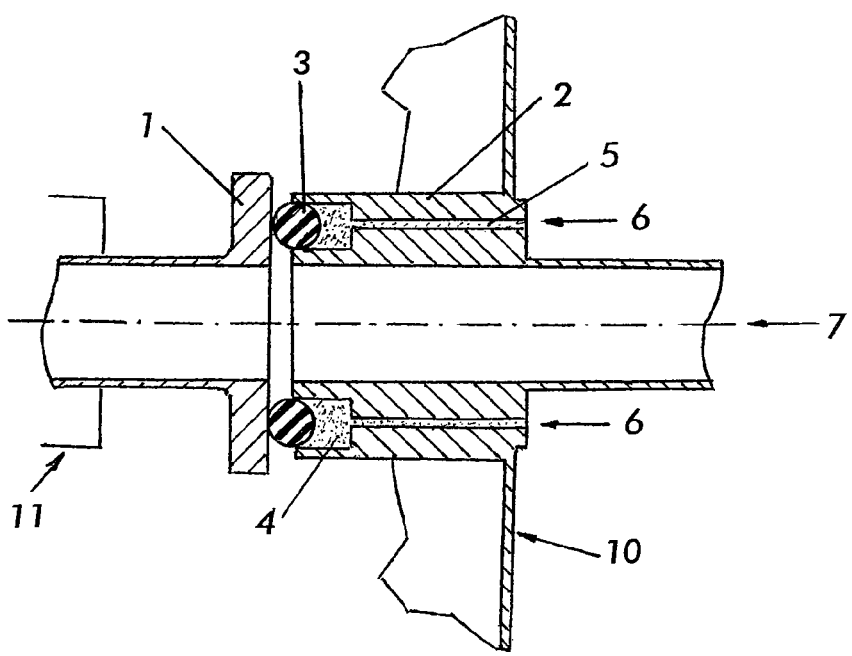
FIG. 2 shows the embodiment of the coupling device according to FIG. 1 when there is sealing engagement of the parts which are to be coupled together.

The embodiment of the coupling device which is shown in FIG. 1 has a first flange 1 connected to a first pipe section and a second flange 2 connected to a second pipe section, which flanges are intended to be mutually sealed, so that media like water or air 7 may pass from the second pipe section to the first pipe section. For this purpose, in the face of the second flange 2 which is directed toward the first flange 1 there is disposed an annular groove 4, in whose floor a duct 5 emerges which is operable to be subjected to a pressurized medium such as, for example, compressed air.

In the annular groove 4 there is disposed a sealing ring 3 made of elastic material, which, when compressed air 6 is supplied to the duct 5, is pressed partially out of the annular groove 4 against the facing end face of the flange 1 and effects the mutual sealing of the flanges 1, 2.

When underpressure is supplied to the duct 5, the sealing ring 3 is drawn into the annular groove 4, thereby allowing an unrestricted mutual displacement of the flanges 1, 2 in the radial direction, without wear to the sealing ring 3.

The use of a sealing ring 3 produces a satisfactory mutual sealing of the flanges 1, 2, even when these are not precisely parallel to each other or the flanges are mutually displaced in the radial direction. The elasticity of the sealing ring compensates for minor inaccuracies.

Since the sealing ring 3 is easily removable from the annular groove 4, a satisfactory cleaning of the coupling device is easily possible even with strict hygiene requirements, so that the coupling device can be used in cleaning, disinfection and drying plants for the treatment of accessories and general laundry in hospital practice and pharmaceutical production, and other plants which are subject to stringent hygiene requirements.

When used in a cleaning, disinfecting and drying plant for the treatment of accessories and general laundry in hospital practice and pharmaceutical production, the pipe section having the flange 1 is fastened to a receiving trolley, schematically shown at 11, which can be pushed into a washing chamber 10 of the plant.

The coupling device can here be disposed between the receiving trolley 11 and a booth-feed facility, for the purpose of connecting spray buttons and nozzles in the receiving trolley.

When the receiving trolley 11 is pushed into the washing chamber 10 and reaches the cleaning position, the flange 1 is aligned essentially with the position of that of the flange 2 of the internal feed facility in the washing chamber.

When the door of the washing chamber is closed, the sealing ring 3 in the annular groove 4 of the flange 2 of the internal feed facility of the washing chamber 10 is pressed with compressed air 6 against the flange 1 of the internal connection coupling of the receiving trolley 11.

This process lasts only a few seconds. As a result of this type of connection, gap losses in the region of the connection coupling are prevented, so that, in the region of the internal connection coupling, pressure and water losses are virtually precluded.

As a result of the construction comprising a linearly displaceable seal in the form of a sealing ring 3 which is pressed against by compressed air 6, an automatic coupling of pressure lines and an optimal connection form is achieved. Optimal is here defined as freedom from dead space, virtual absence of gaps and low peak-to-valley heights.

The coupling device is useful in all categories of clean room apparatus employed in hospital practice and pharmaceutical production.

The application which is described above represents just one example, since the coupling device is usable in a large number of applications in which two piping sections which are movable one relative to the other have to be mutually sealed.

The invention claimed is:

1. A coupling device comprising:
a first pipe section; and
a second pipe section, the first pipe section and the second pipe section being movable relative to each other transverse to a longitudinal axis of the pipe sections;
a first flange positioned at an end of the first pipe section, the first flange having an end face transverse to the longitudinal axis;
a second flange positioned at an end of the second pipe section, the second flange having an end face transverse to the longitudinal axis and facing the end face of the first flange, an annular groove formed in the end face of the second flange and having a first end and a second end, the second flange further including at least one duct leading to the annular groove and opening into the second end of the annular groove;
the at least one duct providing compressed air or an underpressure to the annular groove so as to control a position of a sealing ring; and
the sealing ring positioned within the annular groove, the sealing ring being made of an elastic material and having a circular cross section having a diameter, the sealing ring being pressed against the end face of the first flange at a first position when the compressed air is provided to the annular groove by the at least one duct, and the sealing ring being sucked into the annular groove at a second position when the underpressure is provided to the annular groove by the at least one duct; and
the annular groove having a depth from the first end to the second end of the annular groove greater than the diameter of the sealing ring so that, after the sealing ring is sucked into the annular groove and comes to rest against the second end of the annular groove at the second position, a distance of a point on a surface of the sealing ring farthest from the second end of the annular groove to the second end of the annular groove is less than the depth of the annular groove, thereby allowing a mutual displacement of the first flange and the second flange in a radial direction without wear to the sealing ring.

2. The coupling device as claimed in claim 1, wherein the coupling device is disposed in a cleaning, disinfecting, and drying plant so as to couple a receiving trolley and a washing chamber, the first pipe section and the first flange being fastened to the receiving trolley, and the second pipe section being fastened to the washing chamber by the second flange.

3. The coupling device as claimed in claim 1, wherein the first pipe section and the second pipe section are configured to convey a medium along the longitudinal axis.

4. A coupling device comprising:
a first pipe section; and
a second pipe section, the first pipe section and the second pipe section being movable relative to each other transverse to a longitudinal axis of the pipe sections;
a first flange at an end of the first pipe section, the first flange having an end face transverse to the longitudinal axis;
a second flange at an end of the second pipe section, the second flange having an end face transverse to the longitudinal axis and facing the end face of the first flange, the end face of the second flange defining a first end of an annular groove;
the annular groove formed in the end face of the second flange and having a second end, the second flange further including at least one duct leading to the annular groove and opening into the second end of the annular groove;
the at least one duct providing compressed air or an underpressure to the annular groove so as to control a position of a sealing ring; and
the sealing ring positioned within the annular groove, the sealing ring made of an elastic material and having a circular cross section having a diameter, the sealing ring being pressed against the end face of the first flange when the at least one duct provides the compressed air to the annular groove, and the sealing ring being sucked into the annular groove when the at least one duct provides the underpressure to the annular groove;
the annular groove and the sealing ring being configured such that, when the sealing ring is sucked into the annular groove and comes to rest against the second end of the annular groove, the entire sealing ring does not extend past the first end of the annular groove.

* * * * *

UNITED STATES PATENT AND TRADEMARK OFFICE
CERTIFICATE OF CORRECTION

PATENT NO. : 8,408,603 B2  Page 1 of 1
APPLICATION NO. : 10/553150
DATED : April 2, 2013
INVENTOR(S) : Jürgen Althammer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this
First Day of September, 2015

Michelle K. Lee
*Director of the United States Patent and Trademark Office*